United States Patent
Germaine et al.

(10) Patent No.: US 11,999,299 B2
(45) Date of Patent: Jun. 4, 2024

(54) CAMERA MIRROR SYSTEM DISPLAY CAMERA CALIBRATION

(71) Applicant: STONERIDGE ELECTRONICS AB, Solna (SE)

(72) Inventors: John S. Germaine, Traverse City, MI (US); Dominik Marx, Novi, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 0 days.

(21) Appl. No.: 18/268,750

(22) PCT Filed: Dec. 16, 2021

(86) PCT No.: PCT/US2021/063869
§ 371 (c)(1),
(2) Date: Jun. 21, 2023

(87) PCT Pub. No.: WO2022/140162
PCT Pub. Date: Jun. 30, 2022

(65) Prior Publication Data
US 2024/0042936 A1 Feb. 8, 2024

Related U.S. Application Data

(60) Provisional application No. 63/129,927, filed on Dec. 23, 2020.

(51) Int. Cl.
*B60R 1/22* (2022.01)
*B60R 1/29* (2022.01)
(Continued)

(52) U.S. Cl.
CPC .................. *B60R 1/22* (2022.01); *B60R 1/29* (2022.01); *G06T 7/70* (2017.01); *G06T 7/80* (2017.01);
(Continued)

(58) Field of Classification Search
CPC ....... B60R 1/22; B60R 1/29; B60R 2300/105; B60R 2300/402; B60R 2300/8006;
(Continued)

(56) References Cited

U.S. PATENT DOCUMENTS

| 10,604,157 B2 | 3/2020 | Gerber et al. |
| 2009/0040312 A1* | 2/2009 | Hattori .................. H04N 13/246 |
| | | 348/E17.002 |

(Continued)

FOREIGN PATENT DOCUMENTS

JP 6394281 B2 9/2018

OTHER PUBLICATIONS

International Search Report and Written Opinion for International Application No. PCT/US2021/063869 dated Mar. 17, 2022.

(Continued)

*Primary Examiner* — Farzana Hossain
(74) *Attorney, Agent, or Firm* — Carlson, Gaskey & Olds, P.C.

(57) ABSTRACT

A camera mirror system for a vehicle includes, among other things, first and second exterior cameras that are configured to provide capture images outside of the vehicle that correspond to legally prescribed views. The system further includes first and second displays within a vehicle cabin that are configured to depict the captured images respectively from the first and second exterior cameras. The system further includes first and second interior cameras that are configured to capture driver images within the vehicle cabin. The first and second interior cameras respectively have first and second interior fields of view that overlap one another in a vehicle driver region within the vehicle cabin, the first display is in the second interior field of view, and the second display is in the first interior field of view. The system further includes a controller that is in communication with (Continued)

the first and second displays and the first and second interior cameras. The controller is configured to monitor a driver activity in the vehicle driver region using the first and second interior cameras. The controller is configured to initiate a calibration procedure in response to a calibration event. The calibration procedure includes first and second displays that respectively depict first and second patterns, and the first and second interior cameras detect respectively the second and first patterns to calibrate the first and second cameras in relation to the vehicle driver region to establish a distance between each of the first and second interior cameras and the second and first patterns respectively.

19 Claims, 7 Drawing Sheets

(51) Int. Cl.
  *G06T 7/70* (2017.01)
  *G06T 7/80* (2017.01)
(52) U.S. Cl.
  CPC ... *B60R 2300/105* (2013.01); *B60R 2300/402* (2013.01)

(58) Field of Classification Search
  CPC ... G06T 7/70; G06T 7/80; G06T 2207/10016; G06T 2207/20084; G06T 2207/30208; G06T 2207/30252; G06T 2207/30268; G06T 7/20
  See application file for complete search history.

(56) References Cited

U.S. PATENT DOCUMENTS

| | | |
|---|---|---|
| 2017/0305342 A1 | 10/2017 | Tomioka |
| 2019/0206084 A1 | 7/2019 | Noble et al. |
| 2020/0055480 A1 | 2/2020 | Herbert et al. |
| 2021/0056306 A1* | 2/2021 | Hu ..................... G06V 40/193 |

OTHER PUBLICATIONS

International Preliminary Report on Patentability for International Application No. PCT/US2021/063869 dated Jul. 6, 2023.

* cited by examiner

CAMERA MIRROR SYSTEM DISPLAY CAMERA CALIBRATION

CROSS-REFERENCE TO RELATED APPLICATION

This application claims priority to U.S. Provisional Application No. 63/129,927 filed on Dec. 23, 2020.

TECHNICAL FIELD

This disclosure relates to a camera mirror system (CMS) for use in a commercial truck, for example, incorporating interior cameras for identifying gaze and/or pose of the driver to recognize driver distraction events.

BACKGROUND

There is an increased interest among vehicle manufacturers and fleet operators in detecting events related to distracted driving. One example approach for detecting such events includes training a camera on the driver. Algorithms are used to identify driver behaviors indicative of driver distraction, such as the driver looking away from the road, eating or becoming sleepy. The reliability of these algorithms and its ability to detect events may depend on accurately determining the position of the camera in relation to the driver.

SUMMARY

In one exemplary embodiment, a camera mirror system for a vehicle includes, among other things, first and second exterior cameras that are configured to provide capture images outside of the vehicle that correspond to legally prescribed views. The system further includes first and second displays within a vehicle cabin that are configured to depict the captured images respectively from the first and second exterior cameras. The system further includes first and second interior cameras that are configured to capture driver images within the vehicle cabin. The first and second interior cameras respectively have first and second interior fields of view that overlap one another in a vehicle driver region within the vehicle cabin, the first display is in the second interior field of view, and the second display is in the first interior field of view. The system further includes a controller that is in communication with the first and second displays and the first and second interior cameras. The controller is configured to monitor a driver activity in the vehicle driver region using the first and second interior cameras. The controller is configured to initiate a calibration procedure in response to a calibration event. The calibration procedure includes first and second displays that respectively depict first and second patterns, and the first and second interior cameras detect respectively the second and first patterns to calibrate the first and second cameras in relation to the vehicle driver region to establish a distance between each of the first and second interior cameras and the second and first patterns respectively.

In a further embodiment of any of the above, the legally prescribed views include Class II and Class IV views.

In a further embodiment of any of the above, the first and second displays are arranged respectively at left and right side A-pillars within the vehicle cabin.

In a further embodiment of any of the above, the first and second interior cameras are provided respectively on the first and second displays and configured to be movable respectively therewith. The first and second interior cameras have operational positions that are adjustable relative to one another.

In a further embodiment of any of the above, the controller is configured to determine a distance from each of the first and second interior cameras to a driver feature to evaluate the driver activity.

In a further embodiment of any of the above, the driver activity includes at least one of driver gaze and drive pose.

In a further embodiment of any of the above, the calibration event corresponds to departure of at least one of the first and second interior cameras from a baseline operational position.

In a further embodiment of any of the above, the calibration event corresponds to departure of at least one of the first and second displays from the baseline operational position.

In a further embodiment of any of the above, the calibration event is configured to occur within a calibration window.

In a further embodiment of any of the above, the calibration window is during a vehicle startup procedure.

In a further embodiment of any of the above, the calibration window is below a threshold vehicle speed.

In a further embodiment of any of the above, at least one of the first and second patterns includes multiple lines.

In a further embodiment of any of the above, the at least one of the first and second patterns is black and white checkerboard pattern.

In another exemplary embodiment, a method of calibrating interior cameras used for driver observation within a vehicle cabin, wherein the method is configured to be used with a camera mirror system having first and second exterior cameras that are configured to capture images outside of the vehicle that correspond to legally prescribed views, and first and second displays within the vehicle cabin are configured to depict the captured images respectively from the first and second cameras, the method includes the steps of, among other things, providing an interior camera movable between operational positions, detecting a calibration event that includes the camera being moved between the operational positions, displaying a pattern on at least one of the first and second displays subsequent to the calibration event detection, detecting the pattern with the interior camera mounted, and calibrating the interior camera with the pattern to establish a distance between the interior cameras and the pattern.

In a further embodiment of any of the above, the interior camera is one of first and second interior cameras. The first interior camera has the second display in its field of view, and the second interior camera has the first display in its field of view.

In a further embodiment of any of the above, the first and second interior cameras are provided respectively on the first and second displays and configured to be movable respectively therewith.

In a further embodiment of any of the above, another distance relative to a driver feature can be determined based upon the distance. The driver feature relates to a driver activity.

In a further embodiment of any of the above, the driver activity includes at least one of driver gaze and drive pose.

In a further embodiment of any of the above, the calibration event occurs during at least one of a vehicle startup procedure and below a threshold vehicle speed.

In a further embodiment of any of the above, the displaying step includes displaying the pattern on the first and second displays. The detecting step includes detecting the each of the patterns with the respective other of the first and second interior cameras that are mounted with respect to the other of the respective at least one of the first and second displays. The calibrating step includes calibrating each of the other of the first and second interior cameras with the respective pattern to establish the distance between each of the other of the first and second interior cameras and the respective pattern.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
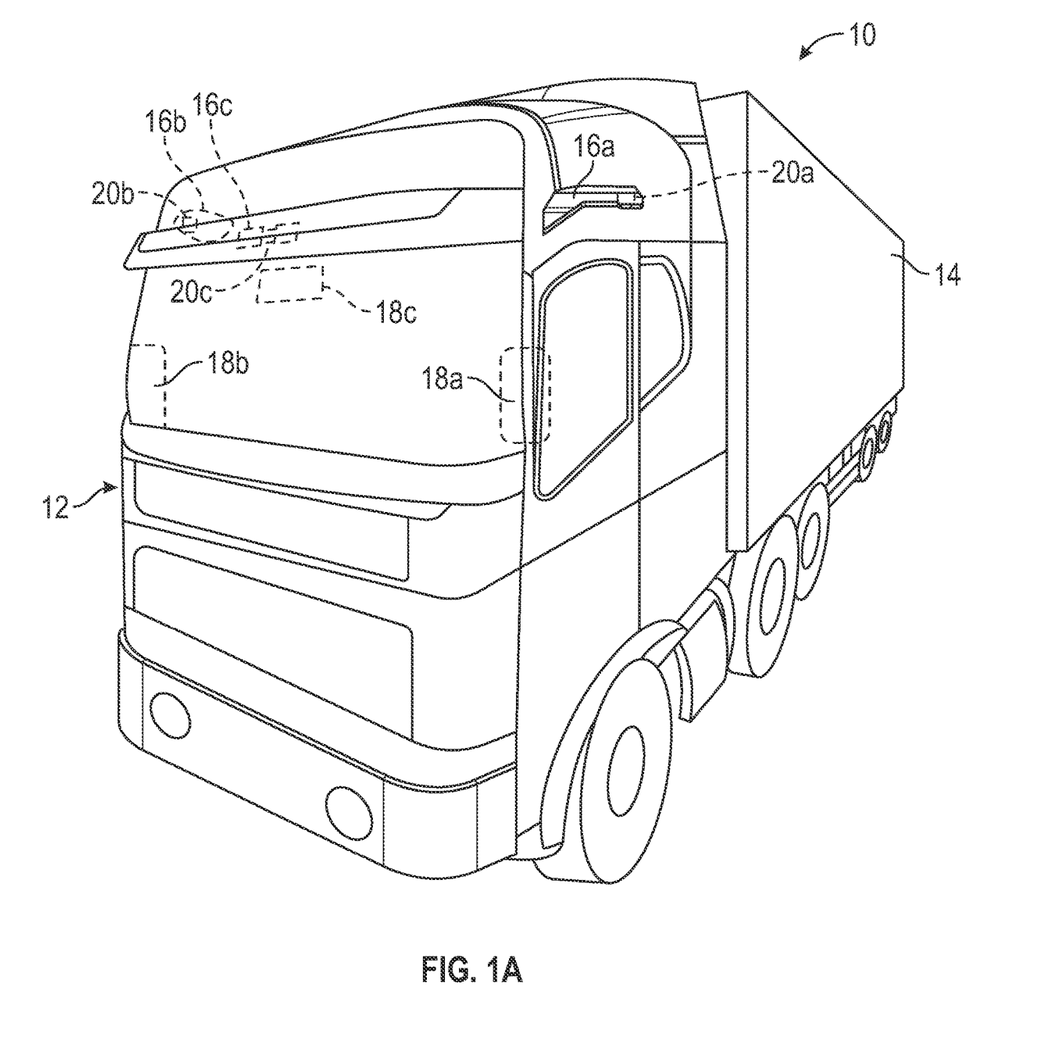
FIG. 1A is a schematic front view of a commercial truck with a camera mirror system (CMS) used to provide at least Class II and Class IV views.
Figure 1B:
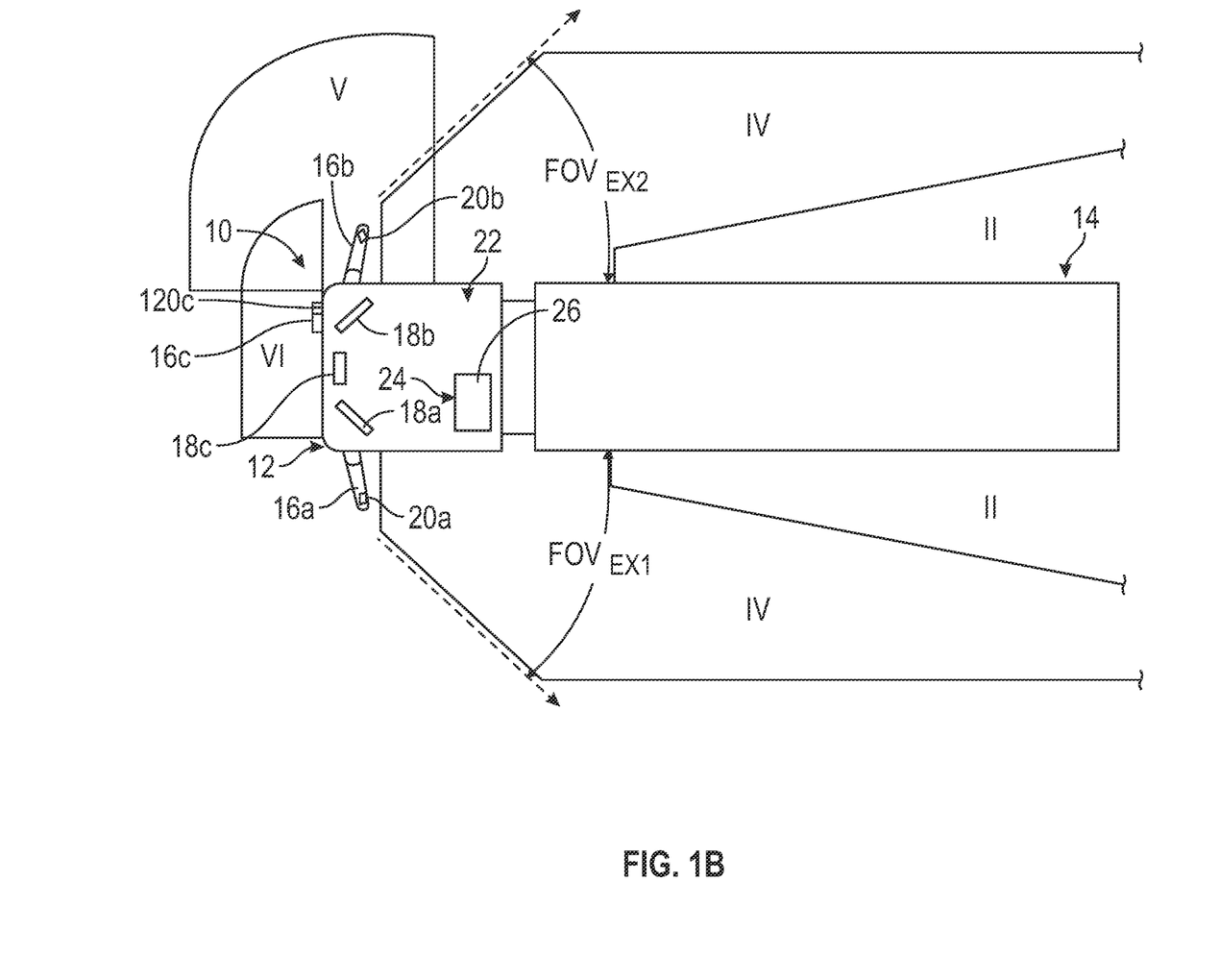
FIG. 1B is a schematic top elevational view of a commercial truck with a camera mirror system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied other types of vehicles. The vehicle 10 incorporates a camera mirror system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors.

Each of the camera arms 16a, 16b includes a base that is secured to, for example, the vehicle cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm may also provide a housing that encloses electronics that are configured to provide various features of the CMS 15.

First and second video displays 18a, 18b are arranged on each of the driver and passenger sides within the vehicle cab 12 on or near the A-pillars to display Class II and Class IV views on its respective side of the vehicle 10, which provide rear facing side views along the vehicle 10 that are captured by the exterior cameras 20a, 20b.

If video of Class V and Class VI views is also desired, a camera housing 16c and camera 20c may be arranged at or near the front of the vehicle 10 to provide those views (FIG. 1B). A third display 18c arranged within the cab vehicle 12 near the top center of the windshield can be used to display to the driver the Class V and Class VI views, which are toward the front of the vehicle 10.

Figure 2:
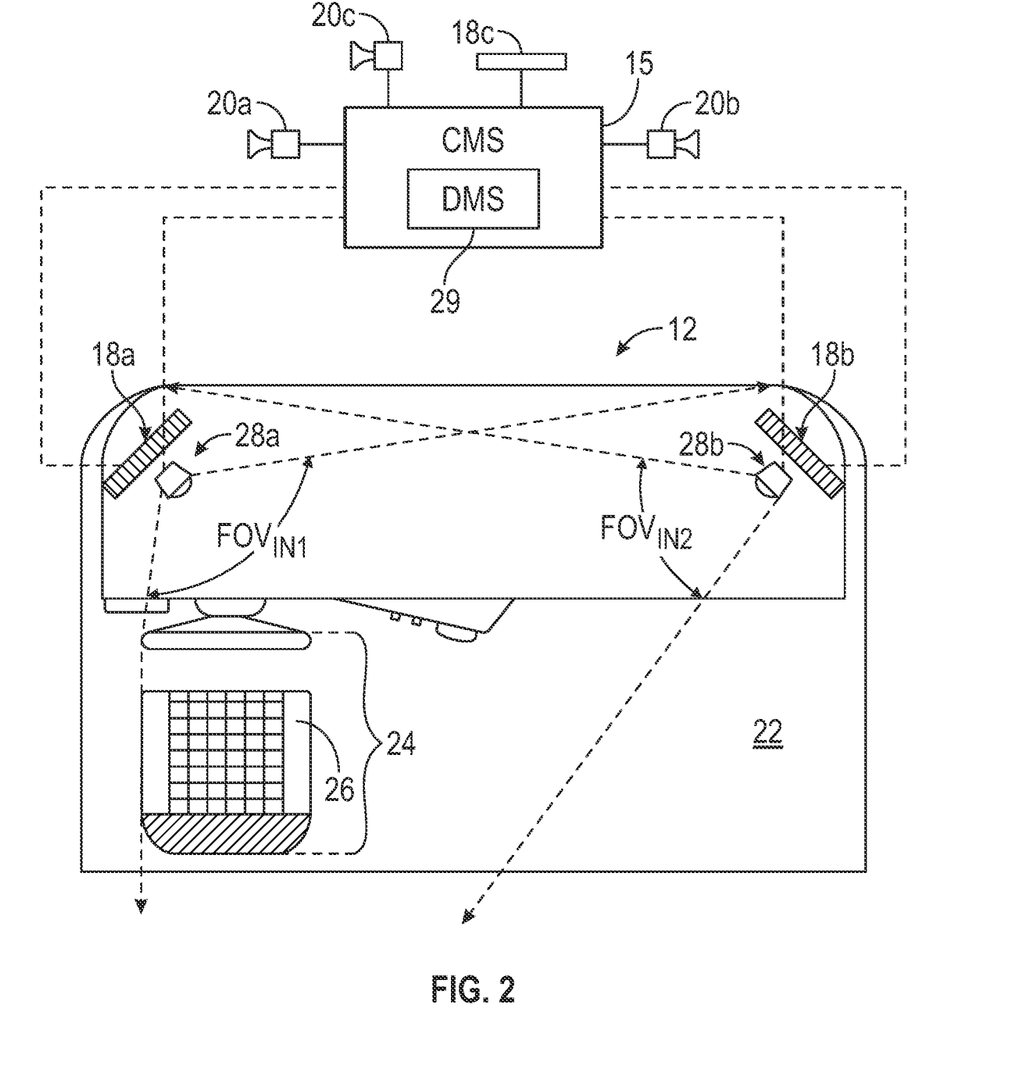
FIG. 2 is a schematic top perspective view of an vehicle cabin including displays and interior cameras.

The displays 18a, 18b, 18c face a driver region 24 within the cabin 22 where an operator is seated on a driver seat 26. It may be desirable to incorporate a driver monitoring system (DMS) 29 into the CMS 15 to evaluate driver activity in the driver region 24 to identify distracted driver behaviors. One example DMS 29 is illustrated in FIG. 2. First and second interior cameras 28a, 28b are arranged in the vehicle cabin 22 near the first and second displays 18a, 18b and are configured to capture driver images within the vehicle cabin 22. The first and second interior cameras 28a, 28b respectively provide first and second interior fields of view $FOV_{IN1}$, $FOV_{IN2}$ that at least partially overlap one another in the driver region 24. The first display 18a is positioned such that it is in the second interior field of view $FOV_{IN2}$, and the second display 18b is positioned such that it is in the first interior field of view $FOV_{IN1}$. Driver activity may be determined by monitoring the gaze and/or pose of the driver while operating the vehicle while using the first and second interior cameras 28a, 28b.

Figure 3:
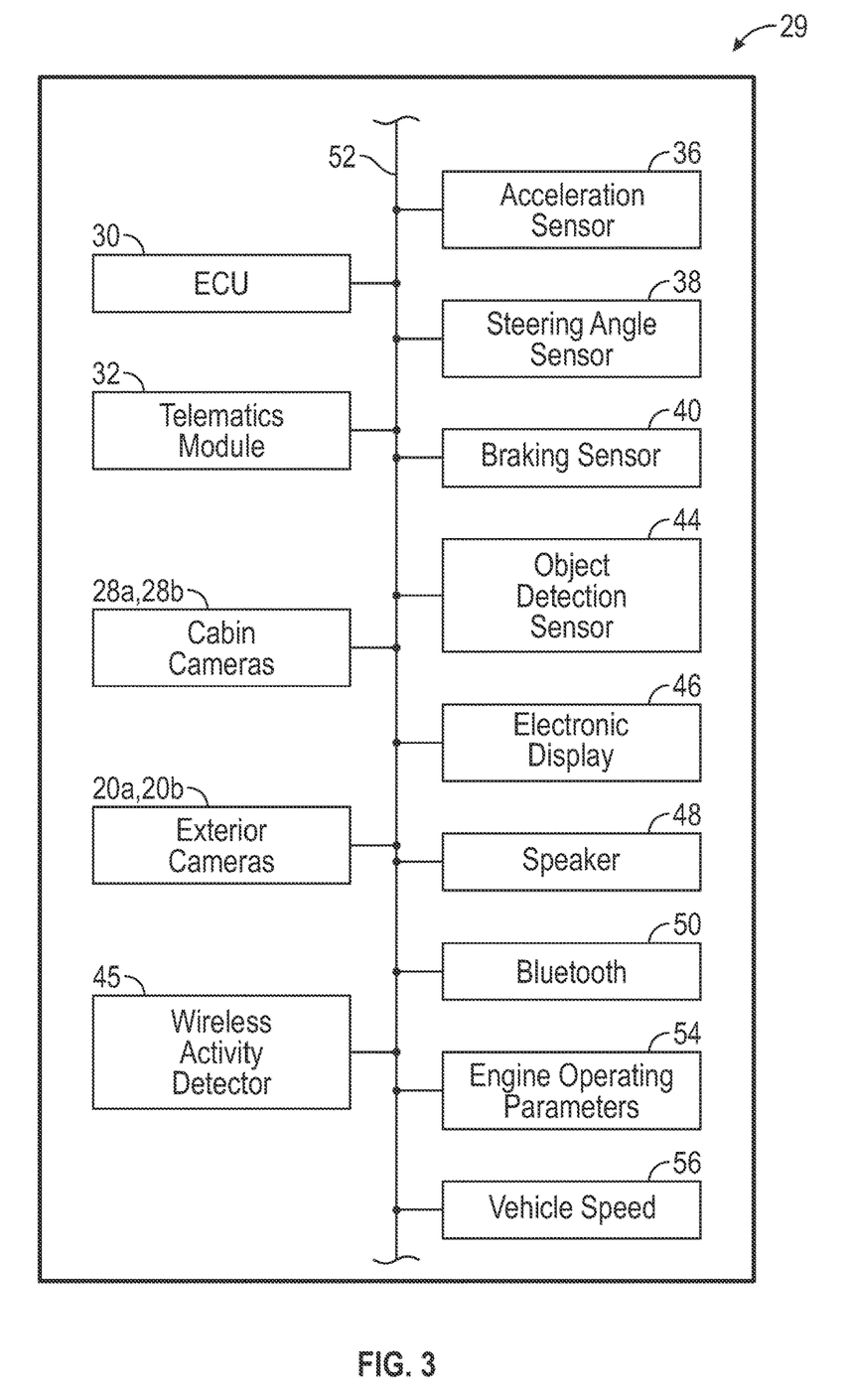
FIG. 3 schematically illustrates components of an example driver monitoring system for the vehicle in FIG. 1.

Referring now to FIG. 3, with continued reference to FIG. 2, the first and second interior cameras 28a, 28b, which may be gaze tracking cameras, are configured to record images of a driver within the cabin 22. One such gaze tracking system is disclosed in U.S. Ser. No. 16/845,228 filed on Apr. 10, 2020 and is incorporated herein by reference in its entirety.

Sensors 36-44, 54-56 associated with the DMS 29 are configured to detect an anomalous driving event of the vehicle based on predefined criteria corresponding to distracted driving, for example, by determining a gaze direction of the driver in the recorded images. An ECU or controller 30 is in communication with the first and second interior cameras 28a, 28b and is configured to detect a potential distracted driving event based on the gaze direction of the driver as depicted in a particular image of the recorded images being outside of a predefined alert driver area for an amount of time exceeding a predefined time threshold. The controller 30 is operably connected to the components 32, 34, 36, 38, 40, 42, 44, 46, 48, 50, 54, 56 through a vehicle data bus 52, which may be a controller area network ("CAN") bus. The controller 30 is configured to perform one or both of the following predefined actions based on the potential distracted driving event: transmission of the particular image to a fleet manager, and storage of the particular image in a local repository of anomalous driving images. The controller 30 can be one controller or multiple controller, if desired.

Figure 4:
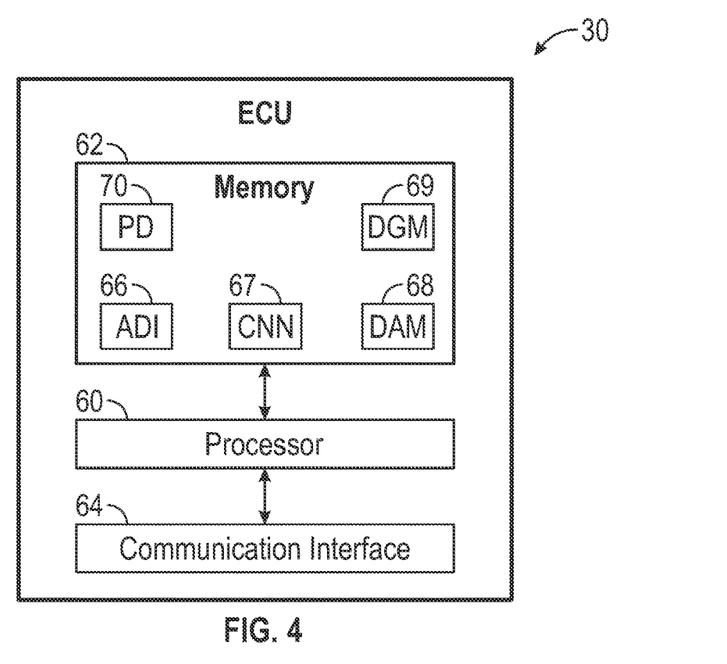
FIG. 4 schematically illustrates an electronic control unit of FIG. 3 in greater detail.

FIG. 4 schematically illustrates the controller 30 in greater detail. The controller 30 includes a processor 60 operatively connected to memory 62, and a communication interface 64. The processor 60 includes one or more processing circuits, such as microprocessors, microcontrollers, application specific integrated circuits (ASICs), or the like. The memory 62 may include one or several types of memory such as read-only memory (ROM), random-access memory, cache memory, flash memory devices, optical storage devices, etc. The memory 62 includes a local repository 66 of anomalous driving images, and optionally may also include a convolutional neural network ("CNN") 67, a driver attention model 68, and/or a driver gaze model 69. In some examples, the pose detector 70 is included within the memory 62 as well. The CNN 67 is, in some examples, operable to detect whether a driver is utilizing a mobile device in a cabin of the vehicle 10. As used herein, a "mobile device" refers to a handheld electronic device such as a cellular phone, smartphone, tablet, personal media player, or the like. Although depicted as being part of the controller 30, it is understood that the CNN 67 could instead be stored external to the vehicle 10, such as in the fleet management server. The communication interface 64 provides for communication between the controller 30 and other components (e.g., a wired connection to the vehicle data bus 52). In other examples, the CNN 67 is operable to detect an overall pose of the driver and trigger one or more responses within the controller 30 based on whether the pose corresponds to attentive or inattentive driving.

In some embodiments, the first and second interior cameras 28a, 28b are provided by a gaze tracking camera configured to record images of a driver within a cabin of the vehicle 10 and determine a gaze direction of the driver in the recorded images. Such cameras are commercially available from SmartEye (https://smarteye.se/) and EyeSight (http://www.eyesight-tech.com/). In one example, the first and second interior cameras 28a, 28b detects gaze by directing infrared or near-infrared light to a user's eye, and then measuring the reflection of that infrared light back from the driver's eye. Based on the angle of reflection, a gaze direction can be ascertained. In another example, the first and second interior cameras 28a, 28b infer the gaze direction of the driver by determining a gaze vector from the general shape of the driver's head and/or the symmetry of the driver's face in a recorded image. Both of these techniques are well known to those of ordinary skill in the art, and therefore are not discussed in detail herein. In one example, the first and second interior cameras 28a, 28b are integrated into a driver information system and/or instrument cluster 46.

The above first and second interior cameras 28a, 28b can also be used to detect drive pose, which relates to the positioning of the driver's body, for example, leaning forward or side-to-side or the positioning of the driver's limbs. Determining pose can provide additional information relating to the activity of the driver and where the driver's attention is focused.

The pose detector 70 is configured to utilize the CNN 67 to track an operator's pose including arm position and orientation, hand position and orientation, torso twisting, relative orientations and/or positions of hands and face, arm and hand position relative to a steering apparatus, and any number of similar pose metrics that combine to define a pose the driver is currently in. The determined pose is then correlated with a number of trained poses and identified as being either attentive or inattentive. In yet further examples, the CNN 67 can combine the pose detection with the gaze detection of the first and second interior cameras 28a, 28b to further improve the ability to distinguish between attentive and inattentive poses.

In one example the controller 30 is configured to continuously identify the drivers pose using the pose detector 70 and trigger an inattentive driver response when a pose corresponding to inattentive driving is detected. By way of example, the response can include auditory, visual, haptic, or any other sensory warning provided to the driver. In alternative examples, the inattentive driver response can be a command to store images of the driver in the inattentive pose generated from cameras in the vehicle for review by a supervisor and/or for further analysis.

In one example, the physical implementations described herein facilitate the tracking and monitoring of a pose of the vehicle operator by the controller 30. When the controller 30 detects an anomalous driving event, the controller 30 reviews the images from multiple video feeds to determine the pose of the driver. Alternatively, the pose is continuously monitored by the pose detector 70. Once the pose is determined the controller 30 determines whether the driver was distracted based at least in part on the pose.

Figure 5:
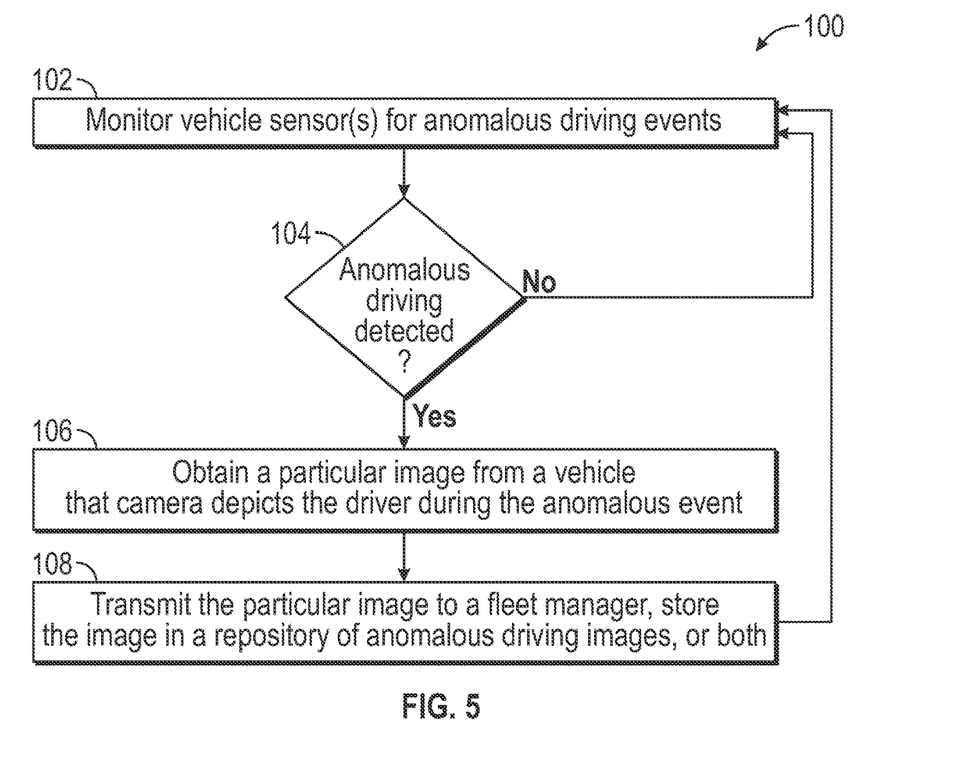
FIG. 5 is a flowchart of an example method of monitoring a driver.

FIG. 5 is a flowchart of one specific example method 100 of monitoring a driver. The controller 30 monitors one or more vehicle sensors (e.g., sensors 36-44, 54-56) for anomalous driving events (step 102). If no anomalous driving event is detected (a "no" to step 104), the controller 30 keeps monitoring for anomalous driving events. If an anomalous driving event is detected (a "yes" to step 104), the controller 30 obtains a particular image from the cabin camera 34 that depicts the driver during the anomalous event (step 106). The controller transmits the particular image to the fleet manager and/or stores the image in the local repository 66 of anomalous driving images, and then resumes monitoring the vehicle sensors for anomalous driving events (step 108).

Figure 7:
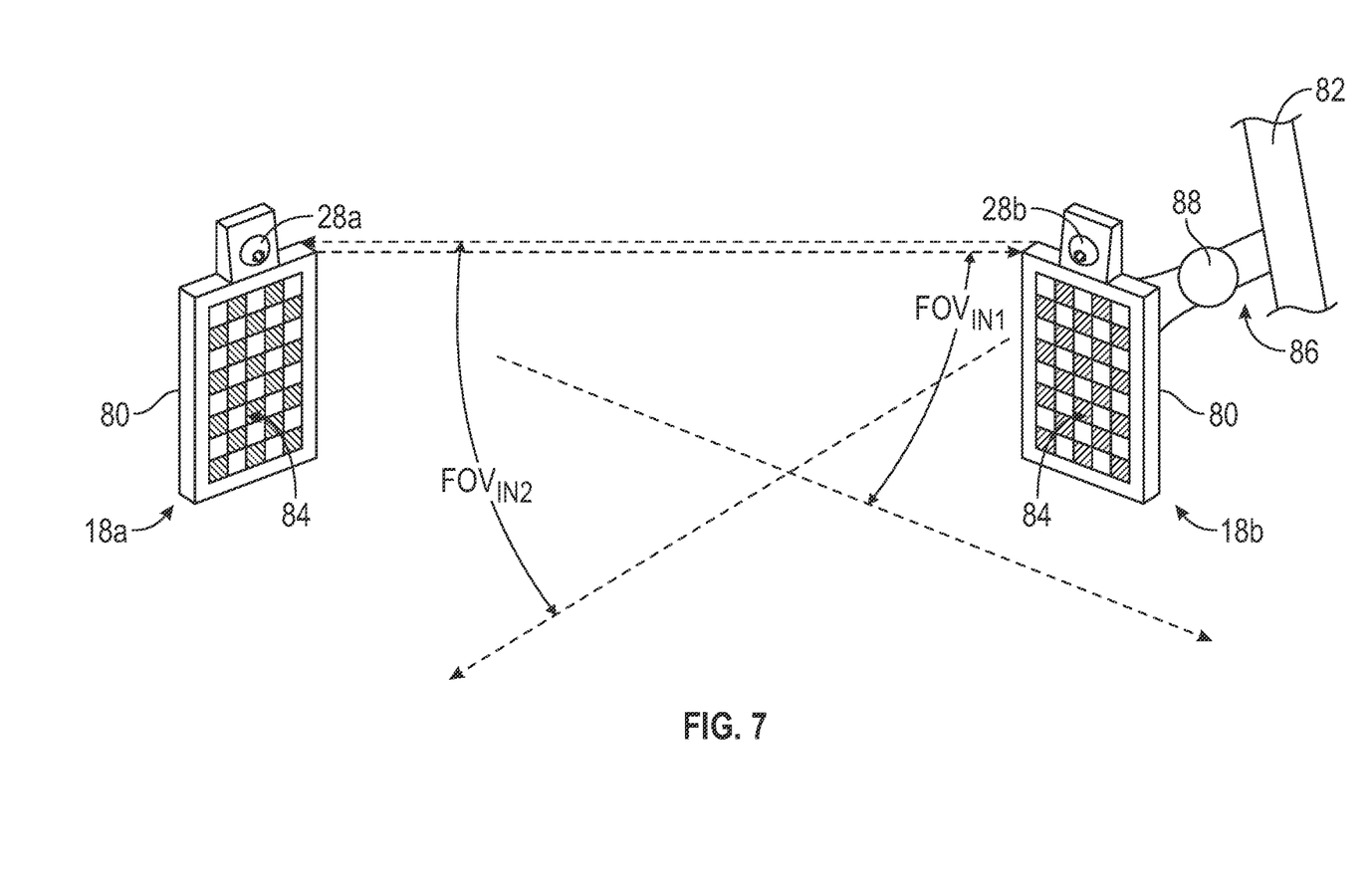
FIG. 7 is a perspective view schematically illustrating a calibration procedure.

Referring to FIG. 7, the first and second interior cameras 28a, 28b are provided respectively on the first and second displays 18a, 18b, for example, mounted to a display housing 80. The housing 80 is secured to a vehicle structure such as an A-pillar 82 via a mounting bracket 86 with an adjustable connection 88. The adjustable connection 88, which may be a ball and socket or other pivoting joint, enables the driver to orient the displays as desired. Adjustment can be used to reduce glare from the display screens, for example. It should also be understood that the first and second interior cameras 28a, 28b could be mounted separately from the first and second displays 18a, 18b, such as on the A-pillar 82 or the instrument panel. Although the first and second interior cameras 28a, 28b are shown on or near the first and second displays 18a, 18b, one or both of the interior cameras may be located elsewhere, for example, on or near the display 18c. In any event, at least one of the first and second interior cameras 28a, 28b have operational positions that are adjustable relative to one another such that their fields of view $FOV_{IN1}$, $FOV_{IN2}$ are adjustable relative to the driver region 24.

At vehicle assembly, the first and second interior cameras 28a, 28b may undergo a calibration procedure to ensure they encompass the desired area in the vehicle cab 12 for monitoring driver activity. The controller 30 relies upon accurate, coordinated image capturing (e.g., coordinate data of driver features and/or image stitching) of the driver region 24 by first and second interior cameras 28a, 28b. So, if either of the first and second interior cameras 28a, 28b are disturbed or otherwise adjusted subsequent to this initial calibration, the controller 30 may no longer be able to accurately interpret driver activity. Thus, if the first and second interior cameras 28a, 28b are moved by adjusting the displays or the interior cameras directly, they must be recalibrated. A warning may be provided to the driver (e.g., audio or visual) until the interior cameras are recalibrated.

A controller, for example, controller 30 is in communication with the first and second displays 18a, 18b and the first and second interior cameras 28a, 28b. The controller 30 is configured to monitor a driver activity in the vehicle driver region 24 using the first and second interior cameras 28a, 28b, which have operational positions that are adjustable relative to one another. The controller 30 is configured to determine a distance from each of the first and second interior cameras 28a, 28b to a driver feature (e.g., eyes, head, etc.) to evaluate the driver activity. The driver activity includes at least one of driver gaze and driver pose, as previously described. According to this disclosure, the controller 30 is configured to initiate a calibration procedure in response to a calibration event, as shown at 200 in FIG. 6.

Figure 6:
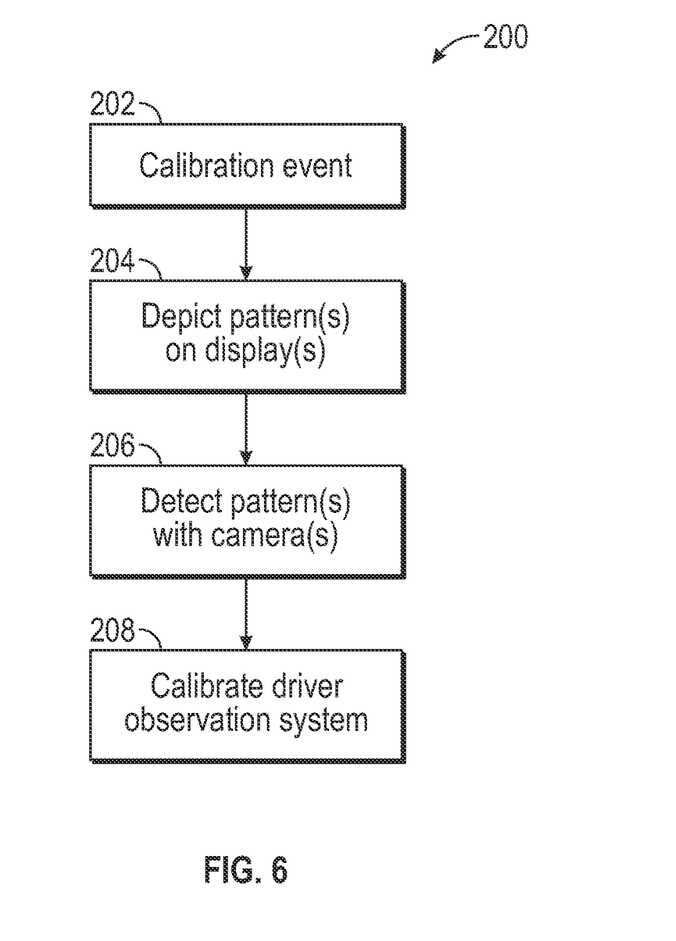
FIG. 6 is a flowchart of an example method of calibrating interior cameras used in the drive monitoring system.

With reference to FIG. 6, in operation, the calibration procedure 200 includes detecting a calibration event (step 202) that includes at least one of the first and second interior cameras 28a, 28b being moved between the operational positions. The calibration event is configured to occur within a calibration window, for example, during a vehicle startup procedure and/or the vehicle being below a threshold vehicle speed. For example, the calibration event corresponds to the departure of at least one of the first and second interior cameras 28a, 28b from a baseline operational position and/or the departure of at least one of the first and second displays 18a, 18b from the baseline operational position. For example, the displays may be adjustable so that the driver can position the displays to minimize glare. In the case of a display-mounted interior camera, moving the display would move the camera, potentially necessitating camera recalibration. So, if only one camera is moved, perhaps only one camera is recalibrated using the display visible to that camera.

A pattern (at 84 in FIG. 7) is displayed on at least one of the first and second displays (step 204) subsequent to the calibration event detection 202. In one example, a pattern 84 is presented on both displays to establish a distance between each of the first and second interior cameras 28a, 28b and the second and first patterns 84 respectively. In one example, at least one of the first and second patterns includes multiple lines (e.g., a "T", an "X", or the like), which may be easier to detect. Although the patterns 84 are shown as being the same as one another, the patterns may be different. At least one of the first and second patterns is black and white checkerboard pattern, in one example, which provides good contrast.

The pattern 84 is detected (step 206) with the other of the first and second interior cameras 28a, 28b mounted on the opposite side of the cabin 22. The other of the first and second interior cameras 28a, 28b is calibrated with the pattern to establish a distance between the other of the first and second interior cameras 28a, 28b and the pattern 84 (step 208).

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera mirror system for a vehicle, comprising:
first and second exterior cameras configured to provide capture images outside of the vehicle respectively corresponding to first and second fields of views;
first and second displays within a vehicle cabin configured to depict the captured images respectively from the first and second exterior cameras;
first and second interior cameras configured to capture driver images within the vehicle cabin, the first and second interior cameras respectively having first and second interior fields of view that overlap one another in a vehicle driver region within the vehicle cabin, the first display is in the second interior field of view, and the second display is in the first interior field of view; and
a controller in communication with the first and second displays and the first and second interior cameras, the controller is configured to monitor a driver activity in the vehicle driver region using the first and second interior cameras, the controller is configured to initiate a calibration procedure in response to a calibration event, the calibration procedure including first and second displays respectively depicting first and second patterns, and the first and second interior cameras detecting respectively the second and first patterns to calibrate the first and second interior cameras in relation to the vehicle driver region to establish a distance between each of the first and second interior cameras and the second and first patterns respectively.

2. The system of claim 1, wherein the first and second displays are arranged respectively at left and right side A-pillars within the vehicle cabin.

3. The system of claim 1, wherein the first and second interior cameras are provided respectively on the first and second displays and configured to be movable respectively therewith, the first and second interior cameras having operational positions that are adjustable relative to one another.

4. The system of claim 1, wherein the controller is configured to determine a distance from each of the first and second interior cameras to a driver feature to evaluate the driver activity.

5. The system of claim 4, wherein the driver activity includes at least one of driver gaze and drive pose.

6. The system of claim 1, wherein the calibration event corresponds to departure of at least one of the first and second interior cameras from a baseline operational position.

7. The system of claim 6, wherein the calibration event corresponds to departure of at least one of the first and second displays from the baseline operational position.

8. The system of claim 1, wherein the calibration event is configured to occur within a calibration window.

9. The system of claim 8, wherein the calibration window is during a vehicle startup procedure.

10. The system of claim 8, wherein the calibration window is below a threshold vehicle speed.

11. The system of claim 1, wherein at least one of the first and second patterns includes multiple lines.

12. The system of claim 11, wherein the at least one of the first and second patterns is black and white checkerboard pattern.

13. A method of calibrating an interior camera used for driver observation within a vehicle cabin, wherein the method is configured to be used with a camera mirror system having first and second exterior cameras configured to capture images outside of the vehicle respectively corresponding to first and second fields of views, and first and second displays within the vehicle cabin are configured to depict the captured images respectively from the first and second exterior cameras, the method comprising the steps of:

provliding the interior camera movable between operational positions;

detecting a calibration event that includes the interior camera being moved between the operational positions;

displaying a pattern on at least one of the first and second displays subsequent to the calibration event detection;

detecting the pattern with the interior camera; and calibrating the interior camera with the pattern to establish a distance between the interior camera and the pattern.

14. The method of claim 13, wherein the interior camera is one of a first interior camera and a second interior camera, and the first interior camera has the second display in its field of view, and the second interior camera has the first display in its field of view.

15. The method of claim 14, wherein the first and second interior cameras are provided respectively on the first and second displays and configured to be movable respectively therewith.

16. The method of claim 14, wherein another distance relative to a driver feature can be determined based upon the distance, the driver feature relates to a driver activity.

17. The method of claim 16, wherein the driver activity includes at least one of driver gaze and drive pose.

18. The method of claim 13, wherein the calibration event occurs during at least one of a vehicle startup procedure and below a threshold vehicle speed.

19. The method of claim 14, wherein the pattern is one of a first pattern and a second pattern, wherein the displaying step includes displaying the first pattern on the first display and the second pattern on the second display, the detecting step includes detecting the first and second patterns with the respective other of the first and second interior cameras, and the calibrating step includes calibrating each of the other of the first and second interior cameras with the respective other of the first and second patterns to establish the distance between each of the other of the first and second interior cameras and the respective other of the first and second patterns.

* * * * *